J. F. BARGHAUSEN.
MACHINE FOR GATHERING CRIMSON CLOVER SEED.
APPLICATION FILED SEPT. 25, 1917.

1,261,202.

Patented Apr. 2, 1918.
3 SHEETS—SHEET 1.

Inventor
John F. Barghausen

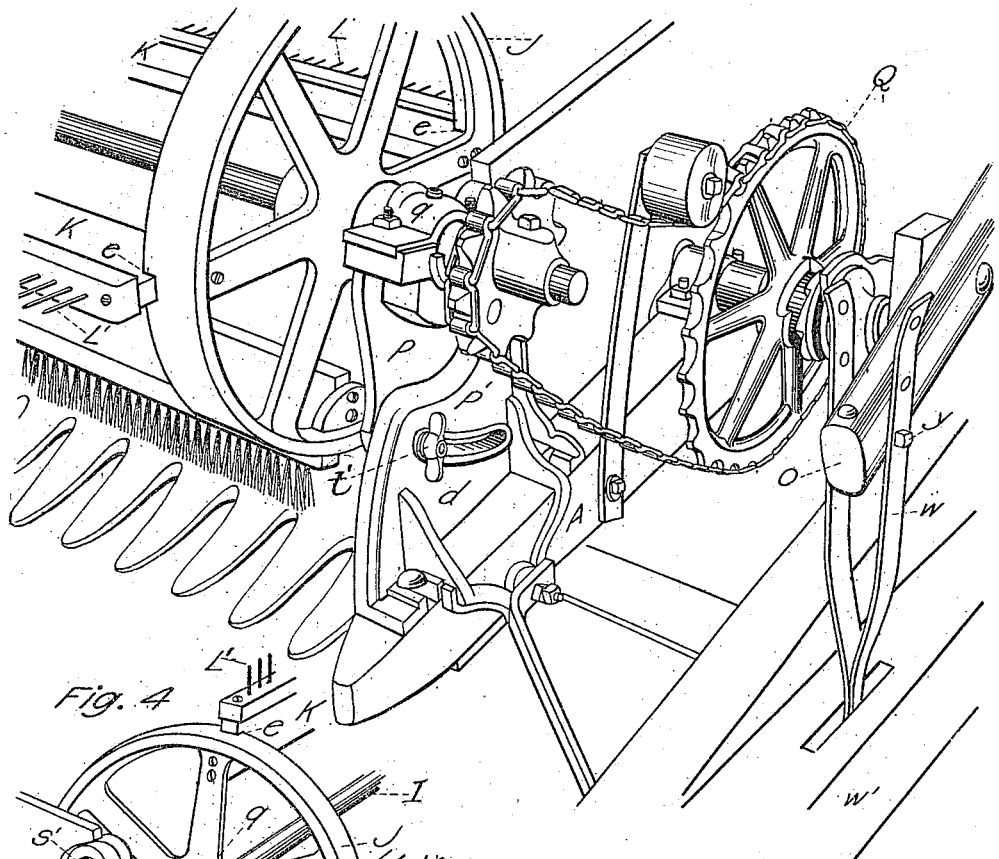

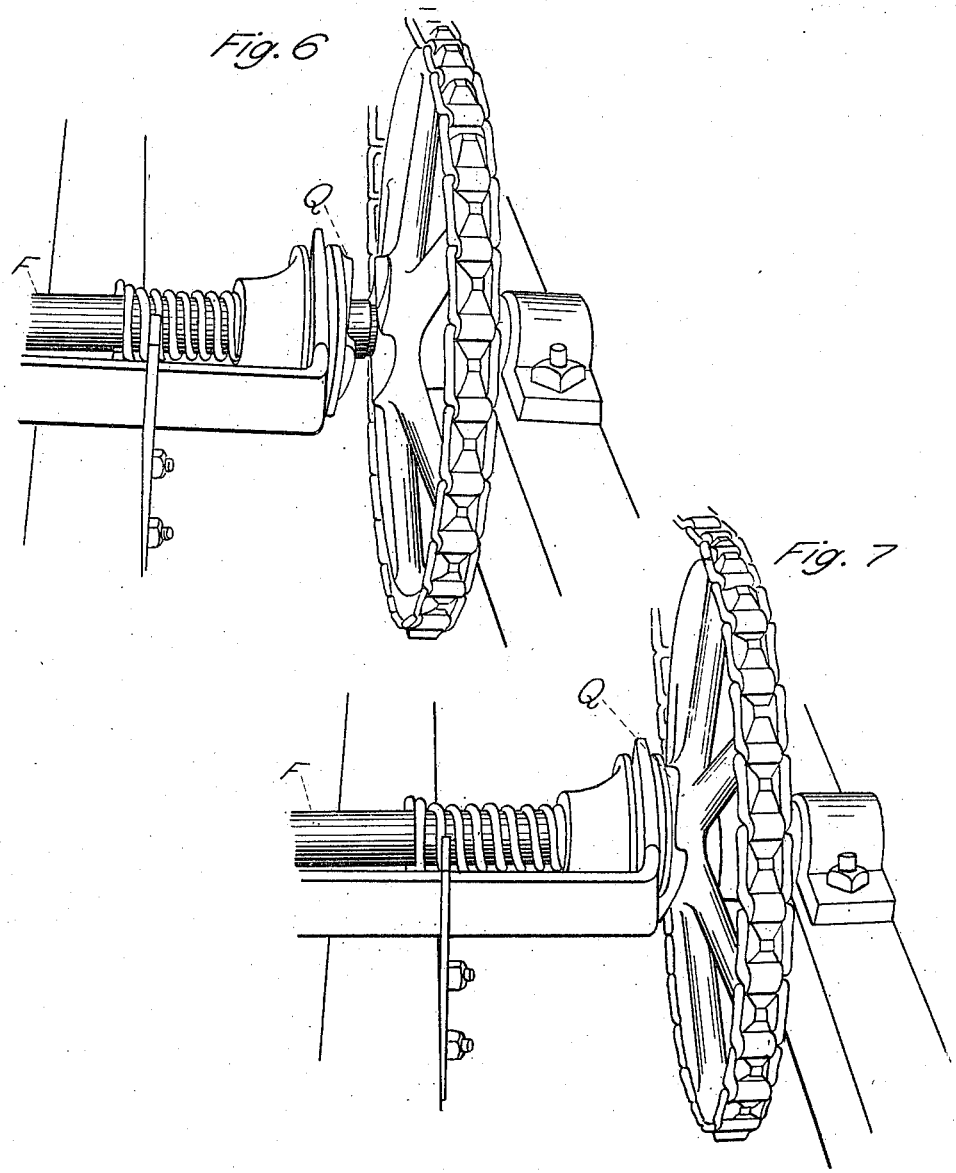

UNITED STATES PATENT OFFICE.

JOHN F. BARGHAUSEN, OF WASHINGTON, DISTRICT OF COLUMBIA.

MACHINE FOR GATHERING CRIMSON-CLOVER SEED.

1,261,202. Specification of Letters Patent. Patented Apr. 2, 1918.

Continuation of application Serial No. 102,659, filed June 9, 1916. This application filed September 25, 1917. Serial No. 193,210.

(DEDICATED TO THE PUBLIC.)

*To all whom it may concern:*

Be it known that I, JOHN F. BARGHAUSEN, a citizen of the United States of America, and an employee of the Department of Agriculture of the said United States, residing in District of Columbia, (whose post-office address is the District of Columbia,) have invented new and useful Improvements in Machines for Gathering Crimson - Clover Seed.

This application is a continuation of application filed June 9, 1916, Serial No. 102,659, on the same subject and is made under the act of March 3, 1883, chapter 143 (22 Stat. 625), and the invention herein described and claimed may be used by the Government of the United States, or any of its officers or employees, in the prosecution of work for the Government, or any person in the United States without payment to me of any royalty thereon.

My invention relates to machines for gathering crimson clover seed.

The object of my invention is to provide an apparatus, simple in construction, and one which is specially designed to remove the crimson clover seed from the heads of the plants as they stand in the field, without cutting or in any way destroying the remaining part of the clover plant.

The object, characteristic features, and scope of my invention will be more readily understood from the following description, taken in connection with the accompanying drawings, wherein.

Figure 1:
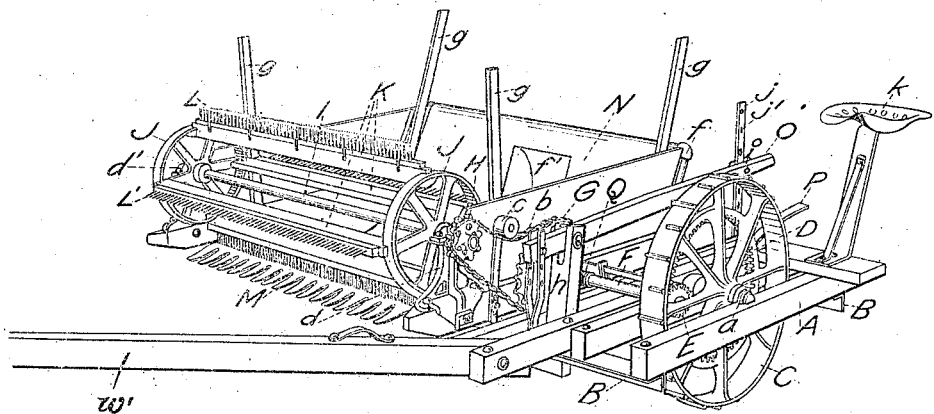
Figure 1 is a perspective view of the machine.
Figure 2:
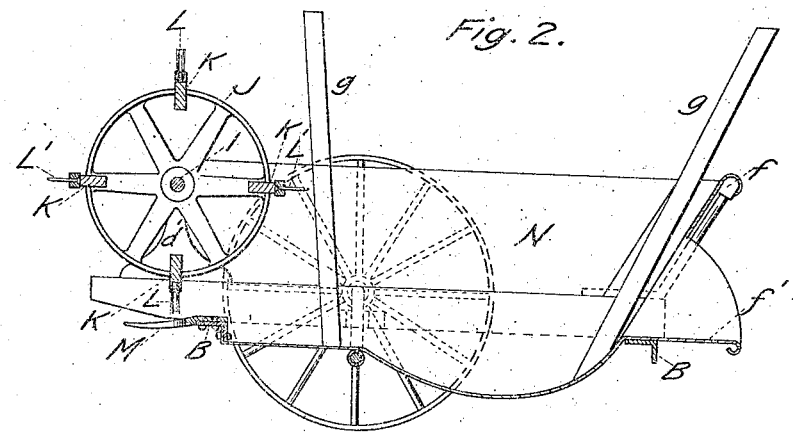
Fig. 2 is a cross section of the rotary steel brushes, pegged strips, guide teeth, and hopper bed.

Figs. 3, 4, and 5 show a modified form of hanger;

Fig. 6 is a detail view of the clutch thrown out; and

Fig. 7 is a detail view of the clutch thrown in.

Referring to the drawings, A represents the framework or base of the machine, made preferably in part of heavy timbers and iron. The iron portion thereof is designated B, to which the heavy timber portion of the framework is secured. This framework is suitably secured to a cross-piece properly connected with wheels for carriage. The iron wheel, C, is constructed preferably 30 inches in diameter, and set in suitable bearings, $a$. This wheel has a ribbed tread and contains an internal gear, D, which is 20 inches in diameter. Engaging the internal gear, D, is the cog wheel, E, carried on a shaft, F, which, in turn, carries a sprocket wheel, G, at the other end. A link chain, $b$, which is kept in place by an idler, $c$, connects the sprocket wheel, G, with a sprocket wheel, H, and transmits power to a shaft, I, which is supported by the adjustable hangers, $d$, $d'$. The said adjustable hangers, $d$, and $d'$ are shown in detail in Figs. 4 and 5. Each hanger is composed of two parts, $p$, and $p'$. The part, $p$, has a shaft bearing, $q$, a projection, $r$, a bolt, $s$, carrying a winged nut, $s'$, and a bolt, $t$, carrying a winged nut, $t'$, all of which parts are hereinafter more fully explained. The part of the hanger designated, $p'$, is fastened to the framework, A, of the machine by means of three bolts, $u$. In the part, $p'$, is an aperture, $u'$, through which aperture, $u'$, the bolt, $s$, passes and by the aid of the winged nut, $s'$, forms a pivoted connection on which the shaft, I, turns. On the rear of the part, $p'$, are a number of indentations, $v$, so made as to receive the projection, $r$, of the part, $p$. The projection, $r$, is held in the desired indentation, $v$, by means of the bolt, $t$, passing through the slot, $v'$, in the part, $p'$, and being held in fixed position by the winged nut, $t'$. This adjustment serves to raise and lower the shaft, I, and the tightening of the nut, $t'$, forms a rigid hanger. Carried on either end of the shaft, I, are the wheels, J, having a plurality of grooves, $e$. In my drawing there are four such grooves, $e$, which are employed to receive the easily detachable cross-strips, K, to which are alternately secured a row of steel brushes, L, and a row of iron pegs, L'. It was found by experiments that a rotating drum with pegs only caused an excessive loss of seed. Strips carrying alternately pegs and stiff hair brushes were tried, but the brushes were not stiff enough to remove the seed; vegetable fiber brushes also proved to be not stiff enough. The strips carrying alternately steel brushes and iron pegs accomplished the desired result, as is more fully hereinafter set forth. These strips, K, may be fastened to the wheel, J, in any suitable manner, preferably by means of two set screws. The wheel, C, is so geared that one revolution of said wheel, C, causes the wheel, J, to rotate approximately ten times. The guide teeth, M, are spaced and secured to the framework, B. These teeth are separated so as to provide space between them of sufficient width to prevent choking or clogging even by large weeds. The hopper, N, is supported by the member, f, which member, f, is fastened to the framework, A, and may be constructed of any suitable material, preferably iron pipe, and made so as to form a framework for the hopper, N. The hopper, N, receives the seed which may be removed from the hopper by brushing or sweeping the seed through opening, f'. The opening, f', may be made of any suitable size or shape and may be cut in any portion of the back of the hopper, N, so as conveniently to remove the seed from the hopper, N. Secured to the hopper body are strips, g, designed for supporting a canvas cover, if needed, for use in harvesting tall clover. The handle bar, O, serves to raise and lower the guide teeth, M, by means of pivoting the whole machine on the center of the framework, A, which framework is centered at the shaft, a, of the wheel, C. Secured to the framework, B, is the member, h, which serves as a fulcrum on which to raise and lower the guide teeth, M. The iron strips, w, are secured at one end of the tongue, w', and at the other end to the handle bar, O, by means of the bolt, y. An iron strip, j, secured to the under portion of the framework, B, serves to hold the handle bar, O, in any position desired by passing a bolt through the aperture, o, in the handle bar, O, and through any of the openings, j', in the strip, j. The lever, P, serves to throw the machine out of gear by means of the ratchet clutch, Q, engaging the shaft, F (Figs. 6 and 7). The seat, K, suitably secured to the framework, A, is adapted for use by the operator of the machine.

My machine when constructed, as described, may be drawn by horses or it may be propelled by any suitable power. The height of the guide teeth, M, of the ground is regulated by means of the handle bar, O. When the guide teeth, M, have been adjusted to suit the height of the clover in the particular field, and when the guide teeth come in contact with the clover heads appearing above said guide teeth, M, the machine being in gear, the rapidly revolving wheels, J, carrying the brushes, L, and the pegs, L', strip the seed hulls from the clover heads, the strips, K, being alternately equipped with the brushes, L, and pegs, L'. The brushes, L, are made of closely set stiff wire, and the pegs, L', are made, preferably, of a single row of steel pegs set about an inch apart. The alternate action of these brushes and pegs serves to strip the seed hulls from the clover heads. In case the harvester is self propelled, it would be necessary to place an idler wheel (not shown) under the tongue, w', in order that the guide teeth, M, could be raised and lowered by means of a handle bar, O.

In operating the machine in any particular field two adjustments are necessary. The first adjustment is the raising or lowering of the guide teeth, M, so that the clover heads will appear just above guide teeth, M. This adjustment is effected by elevating or lowering the handle bar, O, to the desired position and then inserting a bolt through the aperture, o, in the handle bar, O, and through any aperture, j', in the strip, j, as hereinbefore described. The second adjustment is made by means of the adjustable hangers, d, and d', and serves to regulate the height of the brushes, L, and pegs, L', above the guide teeth, M. These two adjustments are made depending upon the short or tall, green or ripe, wet or dry, condition of the clover when harvested; that is, it is desirable to leave as much of the stalk as possible in the field after the seed has been removed, in order that it may be plowed under as a fertilizer. To accomplish this, it is necessary to elevate and lower the guide teeth, M, and also to elevate and lower the shaft, I, carrying the steel brushes, L, and the iron pegs, L', independently from the guide teeth, M. When clover is wet or green, the steel brushes, L, and the iron pegs, L', should strike the clover heads low with the guide teeth, M, also low. This is accomplished by lowering the shaft, I, by means of the adjustable hangers, d, and d'. When the clover is dry and ripe, the steel brushes, L, and the iron pegs, L', should strike the clover heads high with the guide teeth, M, low. This is accomplished by raising the shaft, I, by means of the adjustable hangers, d, and d'. When tall clover is harvested, the guide teeth, M, are raised, and when short clover is harvested the guide teeth, M, are lowered. Fig. 4 shows the adjustable hanger at its lowest point and Fig. 5 shows the hanger at its highest point. Adjustment is made by pivoting the part, p, on the bolt, s, so as to insert the projection, r, on the part, p, into the desired indentation, v, in the part, p'. The bolt, t, of the part, p, passes through the slot, v', in the part, p'. The adjustment is held in place by means of tightly screwing up the winged nuts, s', and t', thus forming a rigid hanger and permitting the shaft carrying the brushes, L, and pegs, L', to be adjusted as may be desired. The adjustment is made at the distance desired from the guide teeth, M, according to the condition of the crop as hereinbefore mentioned. By making these two adjustments as described, the removal of the clover seed is accomplished with a minimum of injury to the plant. The wheels, J, carrying the brushes, L, and the pegs, L', respond to the movement of the carriage wheels upon which the machine is mounted and revolve said brushes, L, and pegs, L', thereby causing said brushes and pegs gently to sweep or brush the clover heads engaging said guide teeth, M, stripping the hulls from the clover heads and brushing them rearward into the hopper, N.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having described my invention, I claim:

1. In a harvesting machine, a series of guide teeth, a rotatable carrier above the guide teeth carrying alternate series of pegs and steel brushes, said pegs and steel brushes coöperating with the guide teeth for effecting the removal of clover seed, substantially as specified.

2. In a harvesting machine, a series of guide teeth, a rotatable carrier above the guide teeth carrying alternate series of pegs and steel brushes, said pegs and steel brushes being adjustable in height in respect to the guide teeth.

In testimony whereof, I affix my signature in the presence of two subscribing witnesses.

JOHN F. BARGHAUSEN.

Witnesses:
   A. H. Fast,
   A. J. Decker.